US012771290B2

(12) United States Patent
Djavanroodi et al.

(10) Patent No.: US 12,771,290 B2
(45) **Date of Patent: *Oct. 20, 2026**

(54) SOLAR PANEL SYSTEM

(71) Applicant: PRINCE MOHAMMAD BIN FAHD UNIVERSITY, Dhahran (SA)

(72) Inventors: Faramarz Djavanroodi, Dhahran (SA); Feroz Shaik, Dhahran (SA); Fouad Mohmmed Jastaniah, Dhahran (SA); Ahmed Ghazi Alharbi, Dhahran (SA); Meshari Khalid Almutlaq, Dhahran (SA); Mohammad Salah Al Yousif, Dhahran (SA); Hatem Masfer Alghamdi, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/069,913

(22) Filed: Mar. 4, 2025

(65) Prior Publication Data

US 2026/0269777 A1 Sep. 10, 2026

(51) Int. Cl.
*H02S 40/10* (2014.01)
*A46B 13/00* (2006.01)
(Continued)

(52) U.S. Cl.
CPC ............ *H02S 40/10* (2014.12); *A46B 13/001* (2013.01); *A46B 13/02* (2013.01);
(Continued)

(58) Field of Classification Search
CPC ...... H02S 40/10; A46B 15/0034; A46B 13/02
See application file for complete search history.

(56) References Cited

U.S. PATENT DOCUMENTS 9,130,502 B1 * 9/2015 Aly ......................... H02S 40/10
2013/0340808 A1 * 12/2013 Komatsu ................ H10F 77/45
136/247

(Continued)

FOREIGN PATENT DOCUMENTS

CN 106972824 A 7/2017
CN 107671068 A * 2/2018

(Continued)

OTHER PUBLICATIONS

English Machine Translation of KR 10-1940378 (Year: 2018).*

(Continued)

*Primary Examiner* — Kourtney R S Carlson
(74) *Attorney, Agent, or Firm* — Oblon, McClelland, Maier & Neustadt, L.L.P.

(57) ABSTRACT

A solar panel system includes solar panels and a frame that has slider structures on two sides and is configured to receive the solar panels. A brush cleaner, including two end structures coupled with the slider structures, slides along the frame to clean the solar panels. The brush cleaner includes a brush extending between the end structures and a plate with air nozzles configured to blow air based on dust detection. The solar panel system further includes a light source emitting source light towards the solar panels, an optical sensor detecting dust based on received light, and an air compressor box positioned on one end of the plate. The air compressor box is mounted on one end structure of the brush cleaner such that the air compressor box does not obstruct the source light, received light, or airflow from the nozzles.

19 Claims, 19 Drawing Sheets

(51) Int. Cl.

| | |
|---|---|
| ***A46B 13/02*** | (2006.01) |
| ***A46B 15/00*** | (2006.01) |
| ***H02S 50/00*** | (2014.01) |

(52) U.S. Cl.

CPC ...... *A46B 15/0008* (2013.01); *A46B 15/0034* (2013.01); *A46B 15/0051* (2013.01); *H02S 50/00* (2013.01); *A46B 2200/3073* (2013.01)

(56) References Cited

U.S. PATENT DOCUMENTS

| | | | | |
|---|---|---|---|---|
| 2017/0070189 | A1* | 3/2017 | Hartman | B08B 1/30 |
| 2018/0331654 | A1* | 11/2018 | Gostein | G01N 21/9501 |
| 2022/0049877 | A1 | 2/2022 | Roogi | |
| 2026/0020664 | A1* | 1/2026 | Orellana Gómez | A46B 13/023 |

FOREIGN PATENT DOCUMENTS

| | | | | | |
|---|---|---|---|---|---|
| CN | 110788080 | A | | 2/2020 | |
| CN | 114499390 | A | * | 5/2022 | |
| CN | 115514312 | A | * | 12/2022 | B08B 13/00 |
| KR | 10-1940378 | B1 | | 1/2019 | |
| KR | 102278466 | B1 | * | 7/2021 | B25J 19/005 |
| WO | WO-2007012026 | A1 | * | 1/2007 | H01L 31/02167 |
| WO | 2020/202116 | A1 | | 10/2020 | |
| WO | WO-2024016089 | A1 | * | 1/2024 | B08B 1/12 |

OTHER PUBLICATIONS

Lamp Definition & Meaning. Merriam-Webster, Merriam-Webster, www.merriam-webster.com/dictionary/lamp. Accessed May 16, 2025. (Year: 2025).*

English Machine Translation of CN 114499390A (Year: 2022).*

English Machine Translation of KR 102278466B1 (Year: 2021).*

Benjamin O. Olorunfemi, et al., "Solar panel surface dirt detection and removal based on arduino color recognition", MethodsX, vol. 10, Dec. 13. 2022, 101967, 9 pages.

U.S. Appl. No. 19/191,528, filed Apr. 28, 2025, Djavanroodi, et al.

U.S. Appl. No. 19/191,597, filed Apr. 28, 2025, Djavanroodi, et al.

U.S. Appl. No. 19/191,674, filed Apr. 28, 2025, Djavanroodi, et al.

U.S. Appl. No. 19/069,913, filed Mar. 4, 2025, Djavanroodi, et al.

* cited by examiner

SOLAR PANEL SYSTEM

BACKGROUND

Technical Field

The present disclosure is directed generally towards a solar panel maintenance system and more particularly relates to a solar panel system for cleanliness and maintenance of solar panels.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The increasing global demand for renewable energy has led to a significant rise in the deployment of solar energy systems. Solar panels, which are pivotal components of such systems, require consistent exposure to sunlight to operate at desirable efficiency. However, the accumulation of dust, dirt, and other particulate matter on the top surface of the solar panels significantly diminishes the ability of the solar panels to absorb sunlight, thereby reducing energy generation capacity. This challenge may be particularly pronounced in regions with high levels of airborne dust or frequent sandstorms. Conventional manual cleaning methods are labor-intensive, time-consuming, and often impractical for large-scale installations, especially in remote or hazardous locations.

Further, automated solar panel cleaning systems have emerged as a solution to mitigate some of these challenges. While existing systems address some aspects of panel maintenance, they often lack integrated mechanisms for real-time dust detection and tailored cleaning responses. Many systems also suffer from design inefficiencies, such as uneven cleaning, excessive water usage, or mechanical components obstructing solar absorption. Furthermore, maintaining the cleanliness of solar panels, particularly in large-scale installations or remote locations, remains a critical operational challenge. Additionally, there is a requirement for systems that may function effectively during nighttime or low-light conditions, ensuring uninterrupted maintenance cycles and reducing downtime.

KR1940378B1 discloses a cleaning robot including a movable frame, a moving body (containing a brush unit), an air blower and a contamination inspection unit. The contamination inspection unit includes a light-emitting unit and a receiving sensor for measuring reflected light. However, this document lacks the integration of a selective activation mechanism for cleaning components based on real-time dust detection, which results in energy inefficiencies and unnecessary wear on the components. Additionally, the document does not describe the use of a combination of light intensity and color sensors for enhanced dust detection.

CN110788080A discloses a cleaning device includes a nozzle and a brush that move along a thread rod in a width direction of a solar panel by gears and track belts. A detection device includes greyscale sensors in which a light-emitting diode emits light and a photoresistor detects the intensity of the reflected light. However, this document does not incorporate a coordinated air compressor system, which can improve the cleaning process by removing stubborn dust particles and keeping the brush clean. Moreover, the document does not mention systematic controller operations that regulates the cleaning sequence for multiple solar panels, thereby lacking the efficiency.

CN106972824A discloses a segmented cleaning device including a photovoltaic outer ring fixing frame, a dust removal track, a photovoltaic inner ring fixing frame, an air compressor, a dust removal telescopic device, a rotating roller brush, a nozzle, an ultrasonic sensor and a light sensor. The dust removal track, the air compressor, the brush and the nozzle are all integrated on one big block that is fixed on the photovoltaic panel. However, this document does not include a selective and dynamic cleaning mechanism where the cleaning components are activated only when dust is detected, leading to unnecessary energy consumption and maintenance cost. Furthermore, the document does not discuss the use of real-time sensor integration combining light intensity and color sensors for improved dust detection accuracy.

Each of the aforementioned prior art suffers from one or more drawbacks hindering the adoption. Accordingly, it is one object of the present disclosure to provide a system for automated cleaning of solar panels that overcome the limitations of the prior art.

SUMMARY

A solar panel system includes solar panels configured to absorb visible light and a frame configured to receive the solar panels therein and including slider structures on two sides of the frame, a brush cleaner including two end structures and a brush, the two end structures coupled with the slider structures so as to slide along the frame. The brush extends between the two end structures and is configured to clean the solar panels. The solar panel system further includes a light source configured to emit a source light towards the solar panels, an optical sensor configured to detect dust on the solar panels based on received light, a plate attached to one side of the brush cleaner and including air nozzles that are configured to blow air towards the brush based on dust detection by the optical sensor and an air compressor box positioned on one of the two end structures of the brush cleaner and positioned on one end of the plate such that the air compressor box does not block the source light, the received light or the air.

In some embodiments, the solar panel system further includes a film positioned on the solar panels. The film is transparent to visible light and is further configured to generate emitted light when it absorbs the source light.

In some embodiments, the solar panel system includes a film that includes a glass matrix with fluorescent material dispersed within it. The light source in the configuration is an ultraviolet light lamp.

In some embodiments, the solar panel system utilizes a source light that includes ultraviolet light. The emitted light generated by the film includes visible light, and the optical sensor is configured to detect dust on the solar panels based on the emitted light from the film.

In some embodiments, the solar panel system incorporates a film where the glass matrix has a light transmission rate of 80% or more for visible light.

In some embodiments, the solar panel system includes a glass matrix within the film that is made of silica.

In some embodiments, the solar panel system includes a plate that extends between the two end structures of the brush cleaner.

In some embodiments, the solar panel system includes a row of optical sensors distributed along the plate. Each of the row of optical sensors is positioned below a respective air nozzle of the air nozzles.

In some embodiments, the row of optical sensors in the solar panel system is configured to detect dust as the brush cleaner slides along the frame.

In some embodiments, the brush cleaner of the solar panel system further includes a top panel extending between the two end structures and positioned above the brush.

In some embodiments, the top panel of the brush cleaner in the solar panel system includes an array of holes.

In some embodiments, the solar panel system includes a plate in direct contact with both of the two end structures of the brush cleaner.

In some embodiments, the brush in the solar panel system includes a shaft with brush fibers attached to it. The shaft extends between the two end structures.

In some embodiments, the solar panel system further includes a motor configured to rotate the shaft of the brush.

In some embodiments, the solar panel system further includes a controller. The controller is configured to move the brush cleaner along the frame, receive dust data from the optical sensor in real time, and independently adjust the air pressure of each of the air nozzles based on the dust data.

In some embodiments, the solar panel system includes a switch sensor configured to turn off the controller at sunrise and turn it on at sunset by monitoring the intensity of visible light.

In some embodiments, the solar panel system includes a light source that includes a light-emitting diode (LED).

In some embodiments, the optical sensor of the solar panel system includes a color sensor configured to determine if a region of the solar panel is clean based on whether the respective reflected light rays are blue or dusty if the rays are brown. Additionally, a light intensity sensor is configured to determine the amount of dust on the region of the solar panel based on the intensity of the respective reflected light rays.

In an aspect, the brush in the solar panel system is as long as or longer than the width of the frame.

In an aspect, the solar panel system includes a plate that is attached to one side of the brush cleaner, while the other side of the brush cleaner is open to the surrounding environment The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1A:
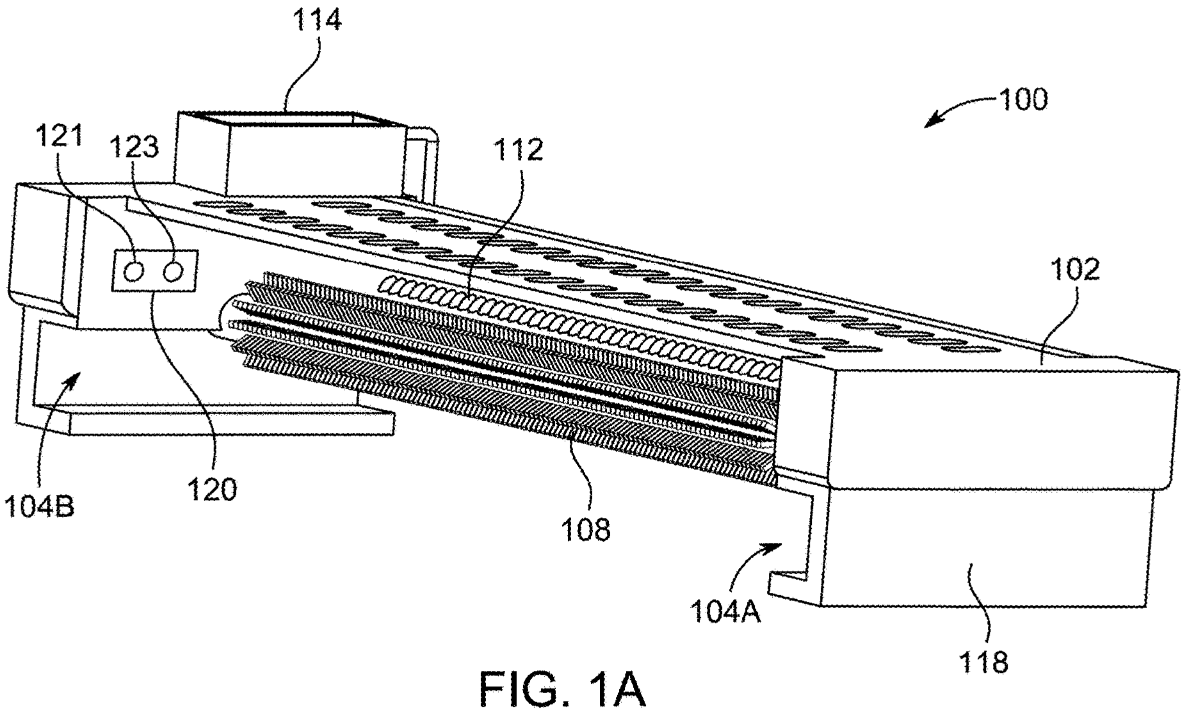
FIG. 1A is a schematic diagram of a solar panel system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure provides a solar panel system (that may also be referred to as a system) to enhance an efficiency and sustainability of solar panel cleaning systems. Techniques herein integrates a controlled-pressure air cleaning mechanism with a rotating brush, to effectively remove dust while preventing dust buildup on the brush itself. By supporting the cleaning process with compressed air through strategically placed nozzles, the system ensures thorough cleaning of solar panels and extends the lifespan of the brush, reducing maintenance needs.

According to aspects of the present disclosure, the system may incorporate sensors and leverage a combination of color sensors, light intensity sensors, and LED illumination to assess panel cleanliness in real time. The sensors provide dust detection by distinguishing between clean (e.g. dark blue) and dusty (e.g. brown) surfaces and measuring light reflection, a metric that typically varies due to the presence of dust. The sensors enable operation during nighttime or low-light conditions, enhancing the versatility of the system.

The system is designed for energy efficiency by operating on an on-demand basis. When sensors detect dust accumulation, the brush and air compressor are activated; otherwise, they remain de-activated or idle to conserve energy and lower operational costs. The system reduces unnecessary wear and tear on the system while maintaining desirable cleaning performance.

The attachable module which can include an air compressor box offers multiple cleaning modes, allowing the panels to be cleaned using the brush alone or in combination with controlled air pressure. The system is programmed to adjust operation of the air compressor box based on the amount of dust detected on the panel surface, ensuring a tailored cleaning process.

The present disclosure improves cleaning efficiency, reduces energy consumption, and ensures cost-effective solar panel maintenance through real-time sensor-driven operation. The integration of high-pressure compressed air as an additional cleaning mechanism enhances the removal of stubborn dust and prevents brush buildup. Smart sensors provide on-demand operation, conserving energy while maintaining effective and sustainable cleaning performance.

Figure 1B:
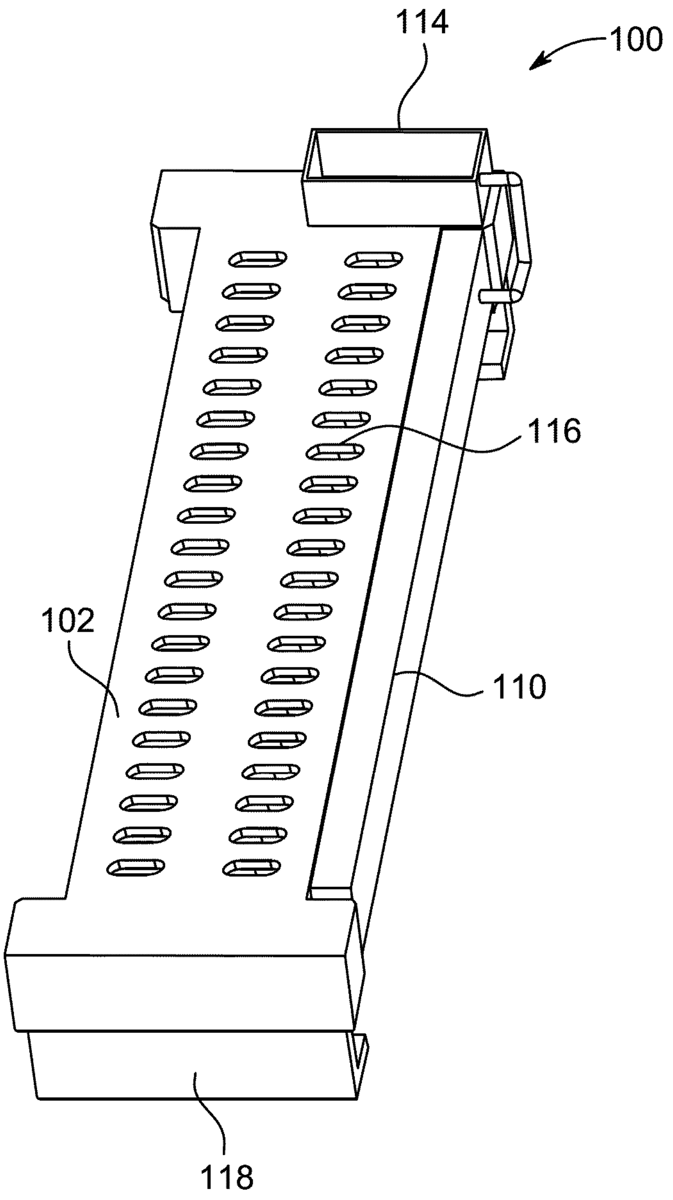
FIG. 1B is a schematic diagram of a solar panel system, according to certain embodiments.
Figure 1C:
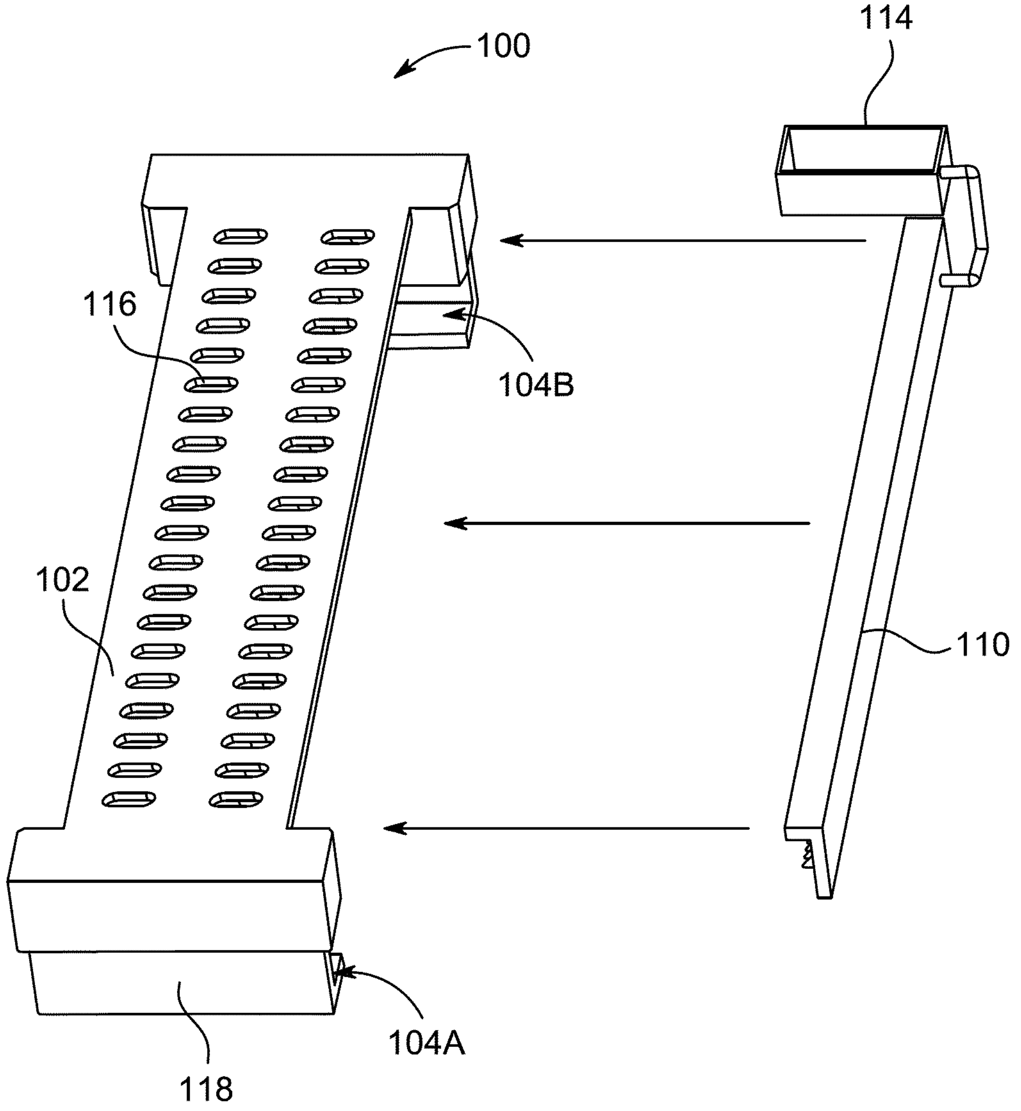
FIG. 1C is an exploded view of the solar panel system, according to certain embodiments.
Figure 2A:
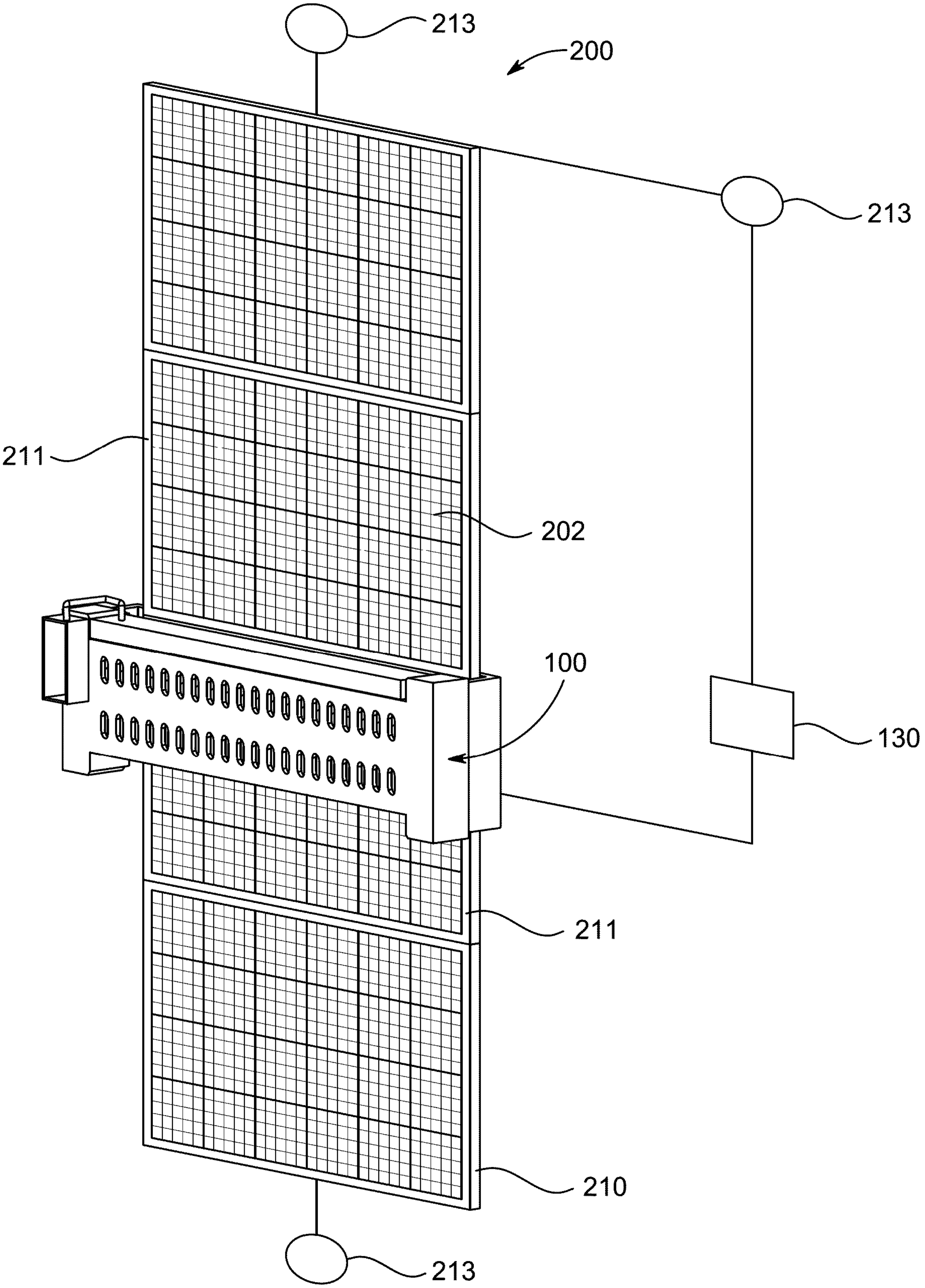
FIG. 2A is a schematic view of the solar panel system in operation as it slides over the solar panel, according to certain embodiments.
Figure 2B:
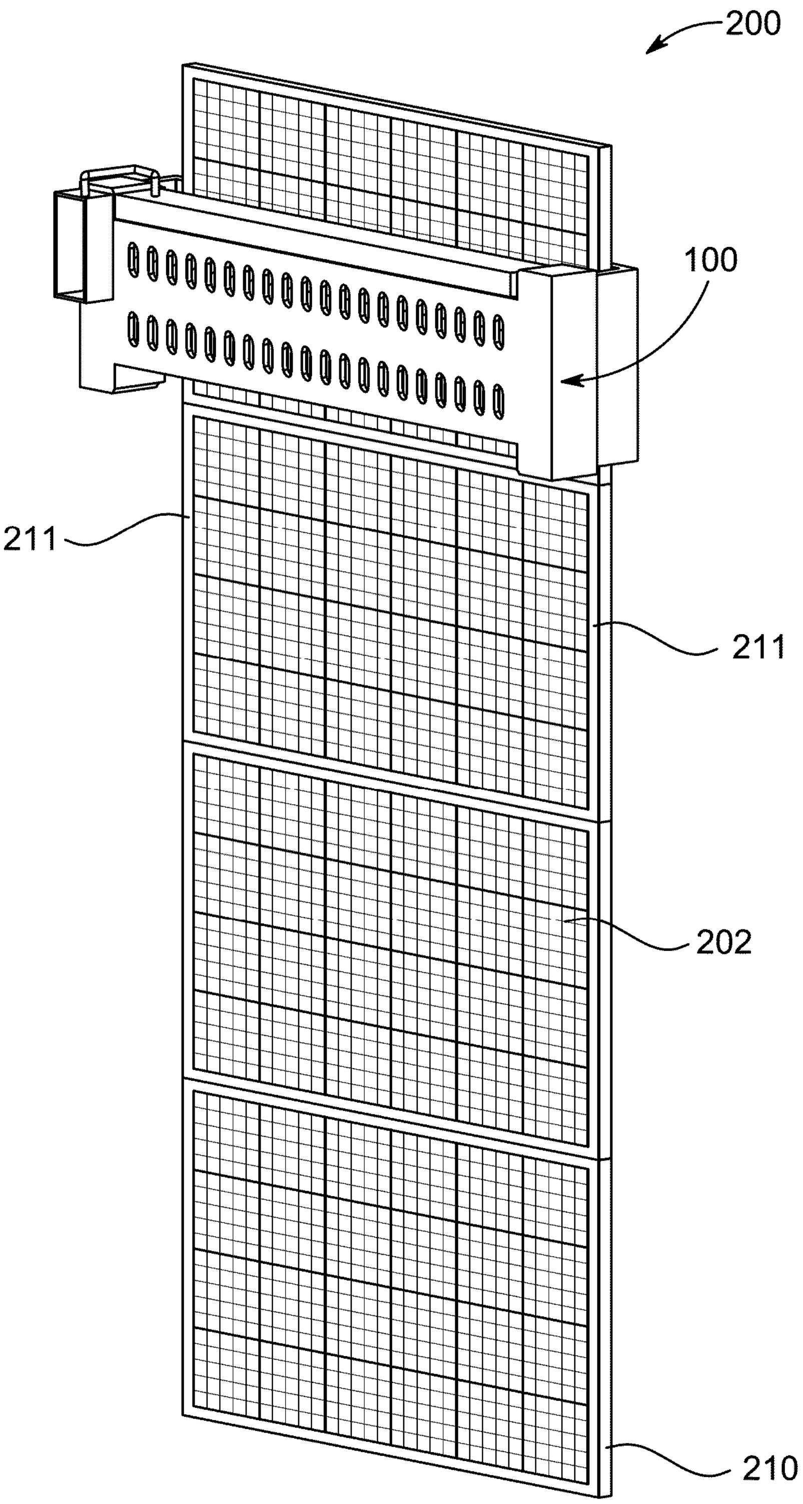
FIG. 2B is a schematic view of the solar panel system in operation as it slides over the solar panel, according to certain embodiments.

FIGS. 1A-1C shows a brush cleaner 100 while FIGS. 2A-2B show a solar panel system 200 (hereinafter referred to as a system 200) including the brush cleaner 100 according to certain embodiments. As illustrated, the system 200 includes a frame 210 that is configured to receive solar panels 202 therein and securely house the solar panels 202 while providing structural support. The frame 210 can also ensure proper alignment of the brush cleaner 100. The frame 210 includes slider structures 211 on two sides of the frame 118. The slider structures 211 can for example be in the form of tracks, rails, or the like.

The brush cleaner 100 includes a main body portion 118 having end structures 104A and 104B and a brush 108. The end structures 104A and 104B are coupled with the slider structures 211 so as to slide along the frame 210. The brush 108 is configured to physically remove accumulated dirt and dust from the solar panel surfaces as it moves along the frame 210. The arrangement ensures comprehensive cleaning coverage across the entire surface area of the solar panels 202, addressing dust, debris, and other contaminants that may accumulate. The brush cleaner 100 further includes a top panel 102 extending between the two end structures 104A and 104B and positioned above the brush 108. The top panel 102 may further include an array of holes 116 that facilitate airflow and reduce any accumulation of particulate matter during the cleaning process.

In some embodiments, a plate 110 is attached to one side of the brush cleaner 100 and includes air nozzles 112 that are configured to blow air towards the brush 108 based on dust detection by one or more optical sensors 120. The plate 110 is attached to the one side of the brush cleaner 100, and another side of the brush cleaner 100 is open to a surrounding environment. The plate 110 is an integral part of the brush cleaner 100, incorporating air nozzles 112 that are configured to blow compressed air towards the brush 108 and the solar panel surfaces. The air-blowing mechanism enhances the cleaning efficiency by dislodging fine particulate matter and preventing dust buildup on the brush 108. By maintaining the cleanliness of the brush 108, the brush cleaner 100 provides consistent cleaning performance over extended periods of operation.

To support the operation of the air nozzles 112, an air compressor box 114 is positioned on one of the two end structures (e.g. 104B in this example) of the brush cleaner 100 and positioned on one end of the plate 110 such that the air compressor box 114 does not block the source light, the received light or the air. The air compressor box 114 provides a controlled source of compressed air to the nozzles, providing targeted and efficient cleaning actions. The air compressor box 114 is placed at one end of the plate 110 to ensure that at the air compressor box 114 does not obstruct the source light, received light, or airflow required for the cleaning process.

In some embodiments, the components of the brush cleaner 100 are designed for modular integration, which may facilitate easy assembly, maintenance, and replacement of individual parts without complex adjustments or realignment. The arrangement of the main body portion 118, the end structures 104A and 104B, the brush 108, the top panel 102, the plate 110, the air nozzles 112, and the air compressor box 114 ensures that components of the brush cleaner 100 work in harmony to deliver desirable cleaning performance.

As mentioned earlier, the end structures 104A and 104B are coupled with the slider structures 211 so as to slide along the frame 210. The guided sliding motion along the frame 210 ensures comprehensive coverage of the surface of the solar panels 202, while the integration of sensors and actuators provides intelligent and adaptive operation. In some embodiments, the sliding action of the brush cleaner 100 over the solar panels 202 ensures that dust and debris are removed effectively. The combination of the brush 108 and the air nozzles 112 provides a cleaning mechanism that improves efficiency and reduces maintenance requirements of the solar panels 202.

In some embodiments, the main body portion 118 is configured to hold and support the brush 108 securely. The main body portion 118 includes the end structures 104A and 104B on the two sides. The end structures 104A and 104B ensure that the brush cleaner 100 maintains consistent alignment and pressure against the solar panel surface, preventing damage while providing effective cleaning.

In some embodiments, the brush 108, extending between the end structures 104A and 104B, moves smoothly along the frame 210 to cover the entire length of the solar panel 202. The movement may be powered by the motor, which is controlled by a controller 130. As the brush cleaner 100 slides, the optical sensors 120 installed on the system 200 monitor the cleanliness of the solar panels 202 in real time. The system 200 can include one or more optical sources 213 configured to emit a source light towards the solar panels 202. The optical sensors 120 can be configured to detect dust on the solar panels 202 based on received light.

For example, the optical sensors 120 can include a color sensor 121 that is configured to determine a region of the solar panel is clean when respective reflected light rays are blue or dusty when the respective reflected light rays are brown and a light intensity sensor 123 that is configured to determine an amount of the dust on the region of the solar panel based on intensity of the respective reflected light rays. Numbers and positions of the optical sensors 120 and the optical sources 213 are not particularly limited. For instance, the optical sources 213 might be positioned an edge, a corner, an edge center or any other location of the frame 210, above the top panel 102, etc. Preferably, the optical sources 213 are positioned on the frame 210 on an opposing side to the air compressor box 114 and/or on the top panel 102 on an opposing side to the air compressor box 114.

In some embodiments, the sliding motion of the brush cleaner 100 is automated and coordinated with the data received from the sensors (not shown in FIG. 2). For example, if the sensors detect areas with higher dust concentration, the controller 130 may adjust the speed of the brush cleaner 100 to allow more thorough cleaning in those regions. Similarly, the air nozzles 112 may deliver higher air pressure to these areas to enhance cleaning efficiency.

Figure 3A:
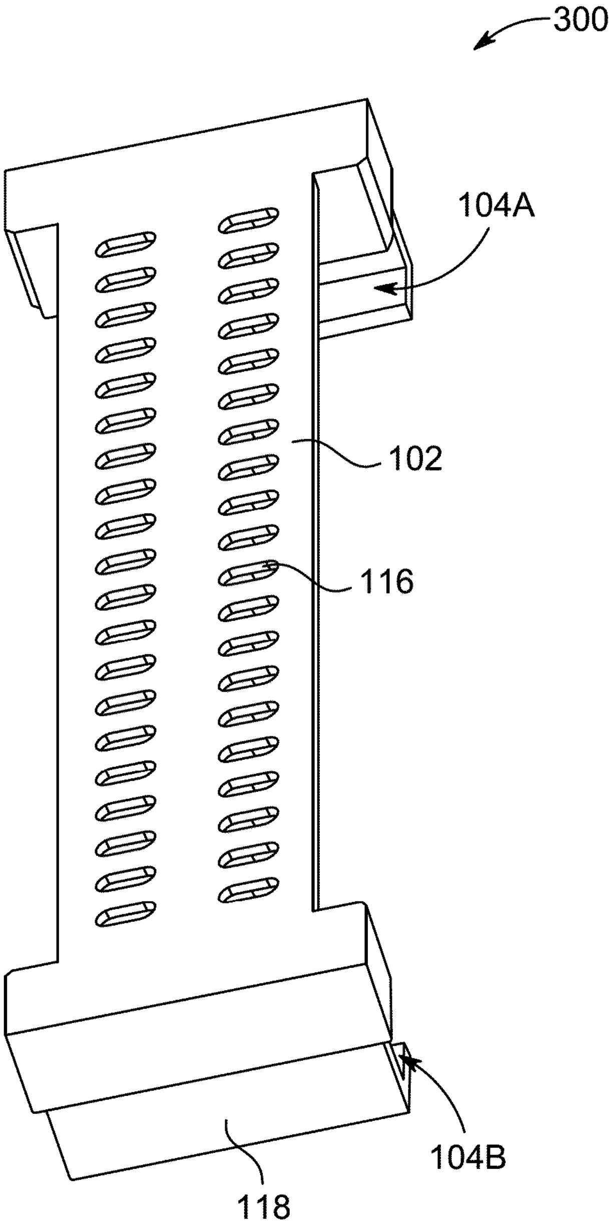
FIG. 3A is an exemplary illustration of a frame of the solar panel system, according to certain embodiments.
Figure 3B:
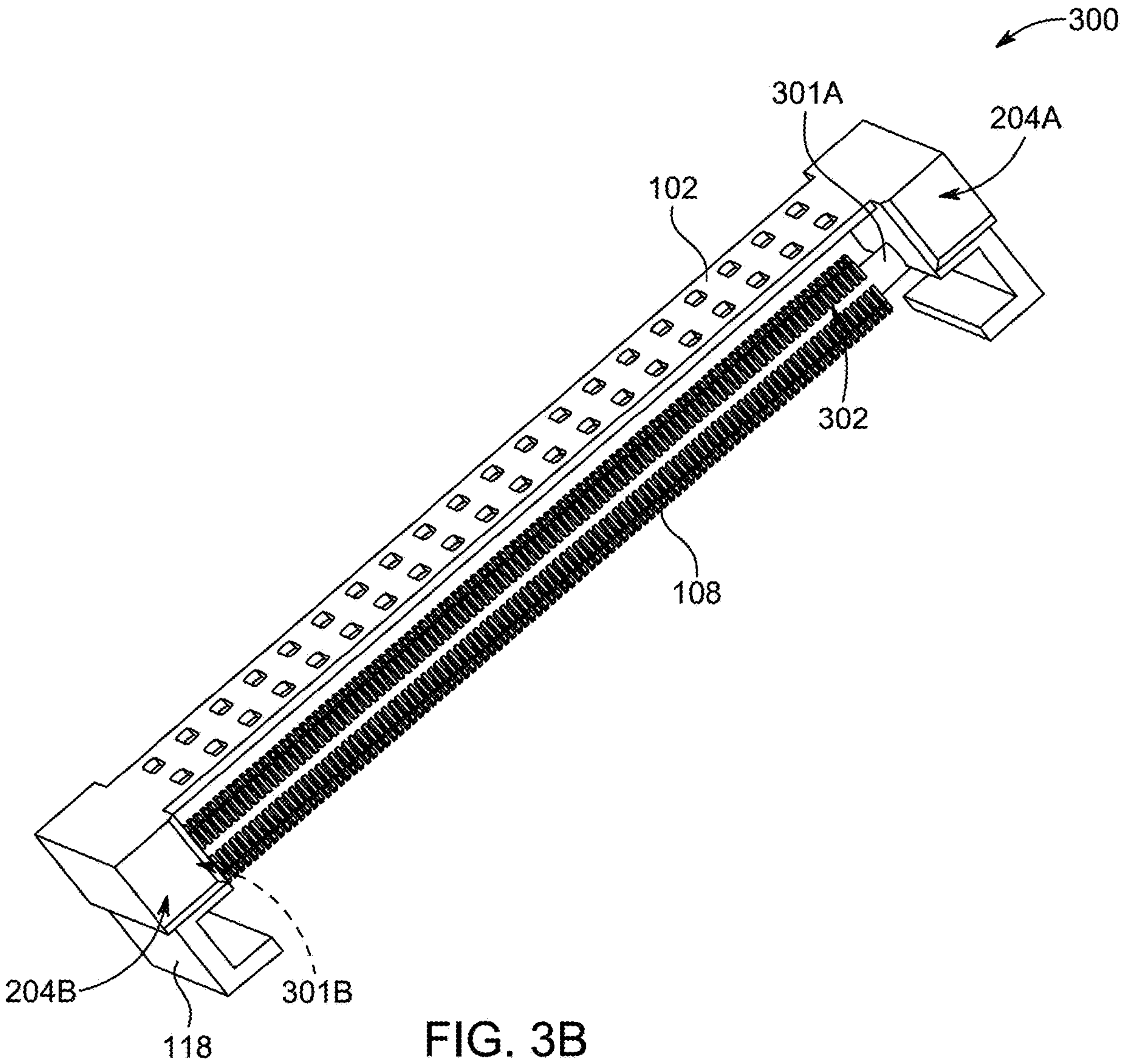
FIG. 3B is an exemplary illustration of a brush cleaner attached to the frame, according to certain embodiments.

FIGS. 3A-3B illustrates an exemplary representation 300 of the brush cleaner 100, according to some aspects of the present disclosure. The brush cleaner 100 includes two end structures 301A, 301B positioned on either side of the brush 108, providing a rigid framework that ensures stability and alignment during operation. The two end structures 301A, 301B are coupled with the slider structures 211 so as to slide along the frame 210. The brush 108 extending between the two end structures 301A, 301B is configured to clean the solar panels 202. The two end structures 301A, 301B are designed to engage with the slider structures 211 of the frame 210, enabling the brush cleaner 100 to traverse along the length of the frame 210. The two end structures 301A, 301B also house mechanisms for coupling the brush cleaner 100 to the frame 210, ensuring secure attachment and smooth sliding motion. In some embodiments, the brush 108 is as long as or longer than a width of the frame 210.

In some embodiments, the brush 108 is centrally positioned between the two end structures 301A, 301B and serves as the primary cleaning component. The brush 108 includes a shaft 302 and brush fibers attached to the shaft 302, and the shaft 302 extends between the two end structures 301A, 301B. The bristles of the brush 108 are configured to contact the surface of the solar panels 202, physically removing dust and debris during the cleaning process. A motor is configured to rotate the shaft 302 of the brush 108.

In some embodiments, the brush cleaner 100 serves as the primary cleaning mechanism in the system 200. The brush cleaner 100 moves across the solar panel surface to dislodge and remove accumulated dust and debris. A controller 130 is configured to move the brush cleaner 100 along the frame 210, receive dust data from the optical sensors 120 in real time, and independently adjust air pressure of each of the air nozzles 112 based on the dust data. The controller 130 ensures that the brush 108 operates only when the optical sensor 120 detects the presence of dust on the surface of the solar panels 202. The selective activation conserves energy and eliminates unnecessary wear and maintenance costs. Additionally, the brush 108 works in coordination with the air compressor box 114 to enhance the overall cleaning efficiency by blowing away loosened particles while maintaining the cleanliness of the brush 108 during operation.

In some embodiments, the top panel 102 extends across the two end structures 301A, 301B, and the top panel 102 is positioned above the brush 108. The top panel 102 provides additional structural integrity and acts as a protective layer for the brush 108, shielding it from environmental elements such as debris and weather. The top panel 102 may also include the array of holes 116 that facilitate airflow and reduce any accumulation of particulate matter during the cleaning process.

During operation, the brush cleaner 100 traverses along the frame 210, guided by the slider structures 211 integrated into the solar panel system 200. The brush 108 rotates or oscillates to clean the surface of the solar panels 202, effectively removing dust and debris. The assembly of the brush cleaner 100 ensures a balanced and stable cleaning process, with components working in unison to maintain the efficiency of the solar panels 202.

Figure 4A:
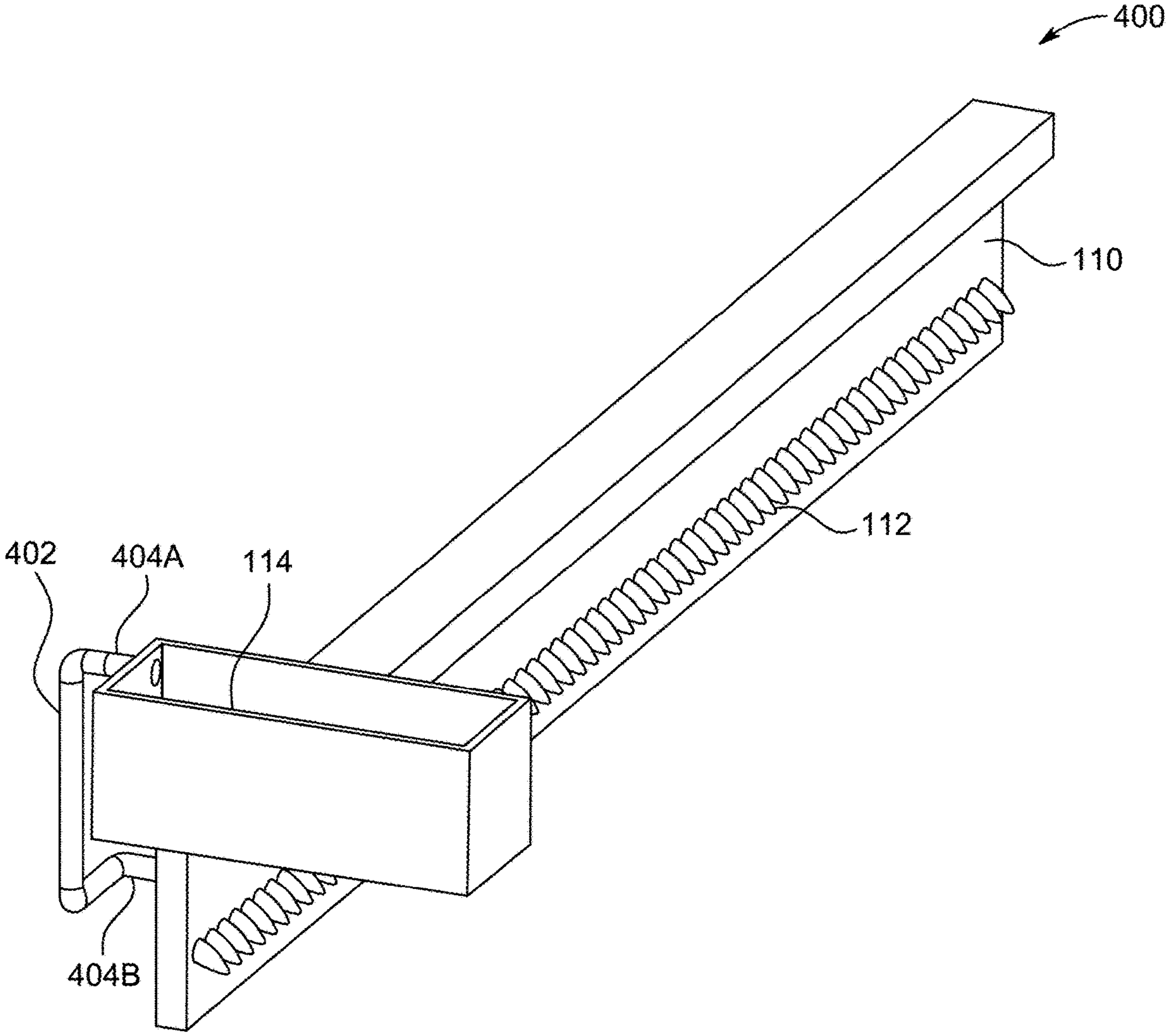
FIG. 4A is an exemplary illustration of a plate and air compression box, according to certain embodiments.
Figure 4B:
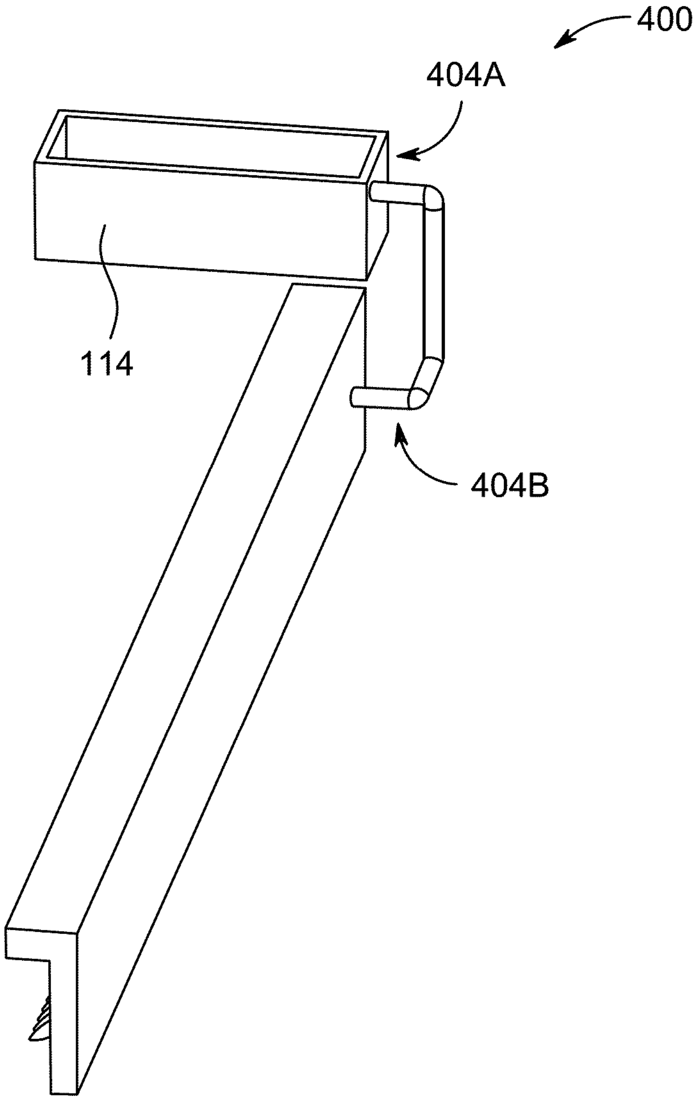
FIG. 4B is an exemplary illustration of a plate and air compression box, according to certain embodiments.
Figure 4C:
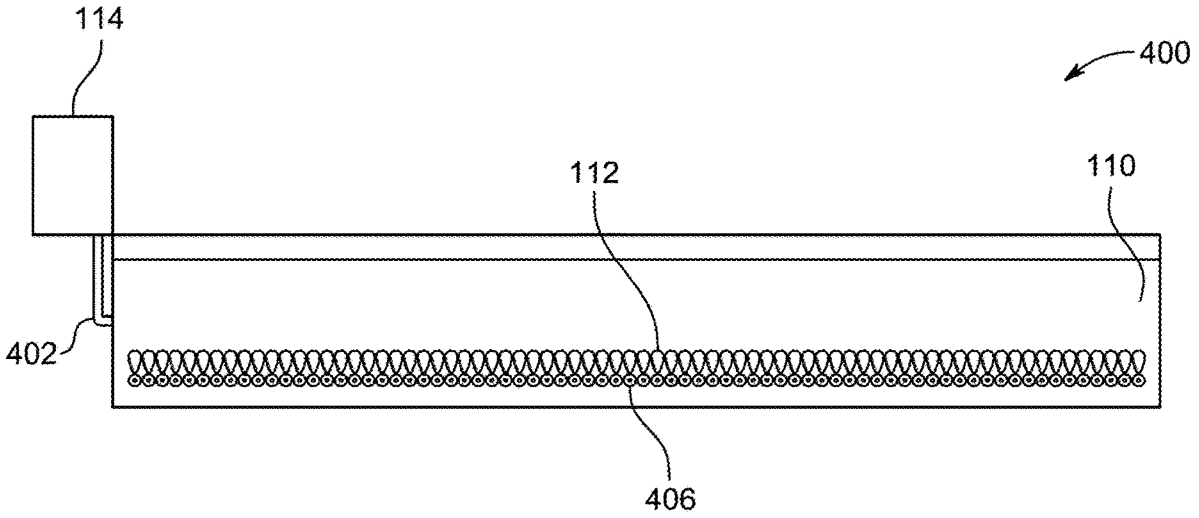
FIG. 4C is an exemplary illustration of a plate and air compression box, according to certain embodiments.

FIGS. 4A-4C illustrates an exemplary representation 400 of the plate 110 attached to one side of the brush cleaner 100 and including air nozzles 112 that are configured to blow air towards the brush 108 based on dust detection by the optical sensor. The plate 110 is in direct contact with both of the two end structures 301A, 301B of the brush cleaner 100. In some embodiments, the plate 110 is attached to the one side of the brush cleaner 100, and another side of the brush cleaner 100 is open to a surrounding environment.

In some embodiments, the air compressor box 114 integrated into the brush cleaner 100. The air compressor box 114 is positioned on one of the two end structures 301A, 301B of the brush cleaner 100 and positioned on one end of the plate 110 such that the air compressor box 114 does not block the source light or the received light (not disclosed in the figure) or the air. The air compressor box 114 serves as a primary housing component, enclosing the air compression mechanism essential for delivering compressed air to the brush cleaner 100.

In some embodiments, the air compressor box 114 includes an air hose 402 that serves as a conduit for transferring compressed air from the air compressor box 114 to the air nozzles 112. The air hose 402 is securely connected to the air compressor box 114 at one end 404A and to the air nozzles 112 at the other end 404B, ensuring a steady and reliable supply of compressed air during the cleaning process. The design of the air hose 402 reduces the risk of air leakage and maintains consistent operation under repeated cycles.

In some embodiments, the air nozzles 112 are distributed along the length of the plate 110 and are configured to direct controlled bursts of air toward the surface of the solar panels 202 and the brush 108. The air nozzles 112 are positioned adjacent to the brush 108 to effectively dislodge dust and debris. The airflow emitted from the air nozzles 112 is adjusted in terms of angle and pressure to ensure thorough cleaning without causing damage to the solar panel surfaces.

In some embodiments, the air compressor box 114 operates in conjunction with the optical sensors 120 integrated into the brush cleaner 100. When the optical sensors 120 detects dust on the solar panels 202 based on received light, the brush cleaner 100 activates the air compressor box 114. The air compressor box 114 delivers air through the compressed air hose 402 to the air nozzles 112, targeting specific areas where additional cleaning is required. The synchronization between the optical sensor and the air compressor box 114 enhances cleaning efficiency and reduces resource wastage.

In some embodiments, the air compressor box 114 integrates with high-pressure air nozzles 112 to enhance cleaning efficiency. The brush cleaner 100 generates high-pressure air, adjustable within a range of 20-30 psi, through the air nozzles 112 mounted near the brush 108. The pressure of the air is controlled to ensure effective cleaning without causing any adverse effects on the solar panel surfaces. The compressed air matches the brush 108 by improving the ability of the brush 108 to achieve a cleaner surface and reduce dust accumulation on the brush fibers. Additionally, the operation of the air compressor box 114 and the air nozzles 112 is triggered only when the optical sensor detects dust on the solar panels 202. The sensor-based activation conserves energy and reduces maintenance costs by ensuring efficient resource utilization.

The air compressor box 114 is designed to be lightweight yet robust, ensuring that it does not impede the mobility of the brush cleaner 100 along the frame 210 and slider structures 211.

FIG. 4C illustrates the solar panel brush cleaner 100 including a row of optical sensors 406 distributed along the plate 110. Further, each of the row of the optical sensors 406 is positioned below a respective air nozzle of the air nozzles 112. The row of the optical sensors 406 may represent some embodiments of the optical sensors 120. Moreover, the row of the optical sensors 406 are configured to detect the dust as the brush cleaner 100 slides along the main body portion 118. The row of the optical sensors 406 can include color sensors that are configured to determine a region of the solar panel is clean when respective reflected light rays are blue or dusty when the respective reflected light rays are brown and light intensity sensors that are configured to determine an amount of the dust on the region of the solar panel based on intensity of the respective reflected light rays.

In some embodiments, the optical sensors 406 are distributed along the length of the plate 110. Each optical sensor in the row is positioned below a corresponding air nozzle 112, to detect the level of dust or debris on the surface of the solar panels 202. The optical sensors 406 are configured to detect the presence of dust on the solar panels 202 as the brush cleaner 100 slides along the main body portion 118. The optical sensors 406 are configured to receive light emitted or reflected from the solar panel surface. The optical sensors 406 analyze the received light to determine the presence and extent of dust accumulation. The optical sensors 406 analyzes these variations and provide real-time feedback to the controller 130, providing identification of dusty regions. The data is transmitted to the controller 130, providing dynamic adjustments to the air pressure and the operation of the brush cleaner 100. The alignment allows for efficient dust detection and targeted air bursts, ensuring desirable cleaning performance.

As depicted in FIGS. 4A-4C, the integration of the air compressor box 114, compressed air hose, and air nozzles 112 significantly augments the cleaning capabilities of the solar panel system 200. The targeted delivery of compressed air ensures effective removal of stubborn dust and debris, contributing to the sustained performance and efficiency of the solar panels.

Figure 5A:
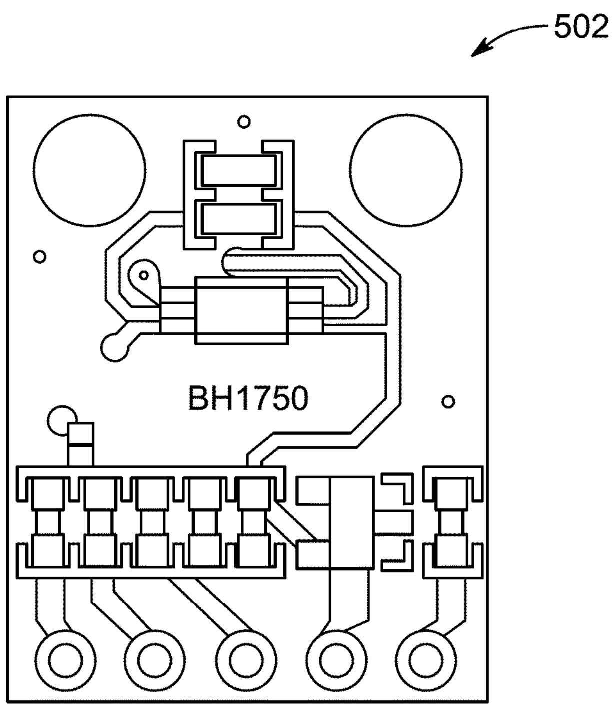
FIG. 5A is an exemplary illustration of a light intensity sensor, according to certain embodiments.

FIG. 5A illustrates a light intensity sensor 502 integrated within the system 200 to monitor ambient light conditions. The light intensity sensor 502 can represent some embodiments of the light intensity sensor 123. The light intensity sensor 502 determines the operational periods of the brush cleaner 100. For example, the light intensity sensor 502 is configured to detect sunrise and sunset, permitting the controller 130 to activate or deactivate the cleaning operations accordingly. The light intensity sensor 502 provides efficient energy usage and avoids unnecessary operation during low-light conditions when cleaning is less effective.

Figure 5B:
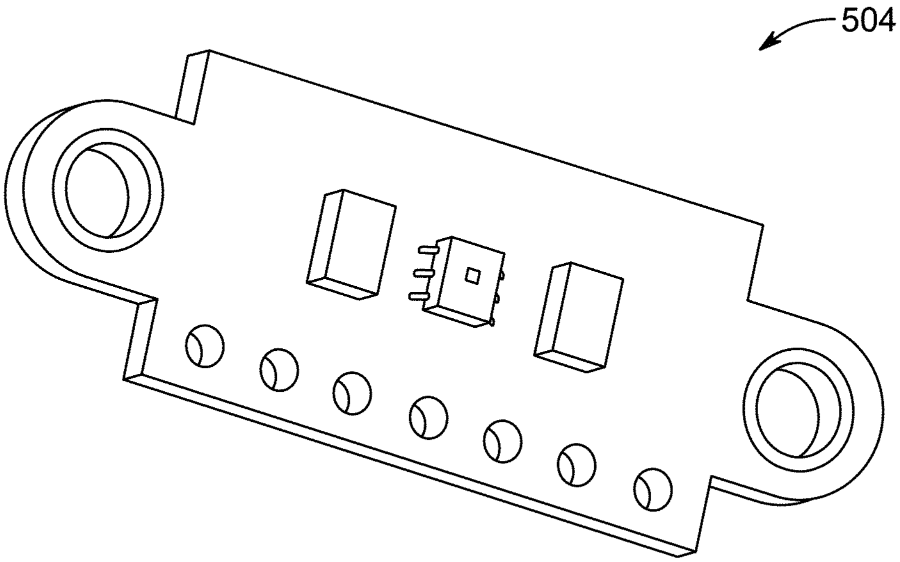
FIG. 5B is an exemplary illustration of a microcontroller, according to certain embodiments.

FIG. 5B illustrates a controller 504, which can represent some embodiments of the controller 130. The controller 504 processes the data collected from the optical sensors (e.g. 120, 406, 502) and initiates appropriate responses. For instance, when the optical sensors 406 detect high dust levels, the controller 504 activates the air nozzles 112 to deliver compressed air and directs the brush 108 to focus on heavily dusted areas. The closed-loop feedback mechanism ensures targeted and efficient cleaning, reducing resource wastage.

Figure 5C:
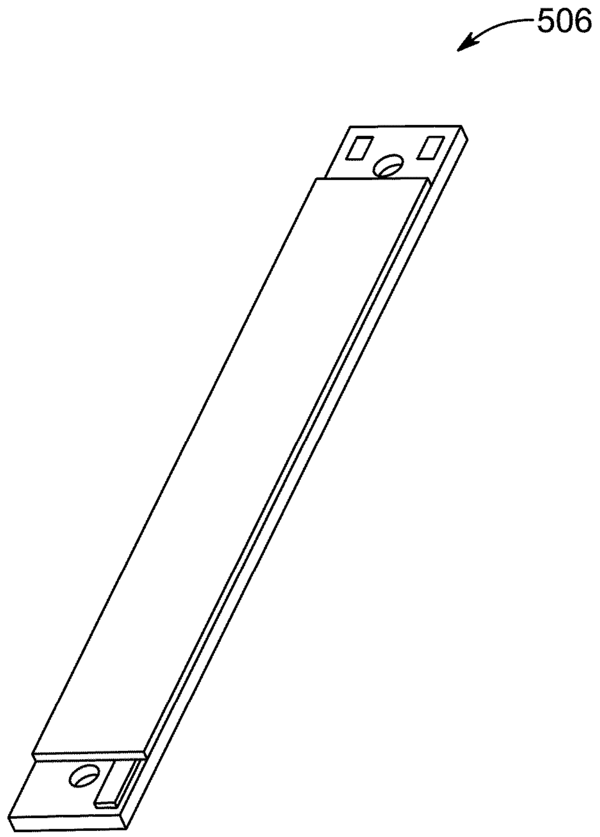
FIG. 5C is an exemplary illustration of a switch sensor, according to certain embodiments.

FIG. 5C illustrates a switch sensor 506, a component of the energy-saving mechanism. The switch sensor 506 is configured to turn off the controller 504 at sunrise and turn on the controller 504 at sunset by monitoring visible light intensity. The switch sensor 506 monitors the intensity of ambient visible light. By continuously monitoring the light levels, the switch sensor 506 may accurately determine sunrise and sunset times. Based on the information, the switch sensor 506 automatically turns off the controller 504 at sunrise and turns the switch sensor 506 on again at sunset ensuring that the system 200 operates only during necessary periods, reducing energy consumption and improving operational efficiency.

Figure 6:
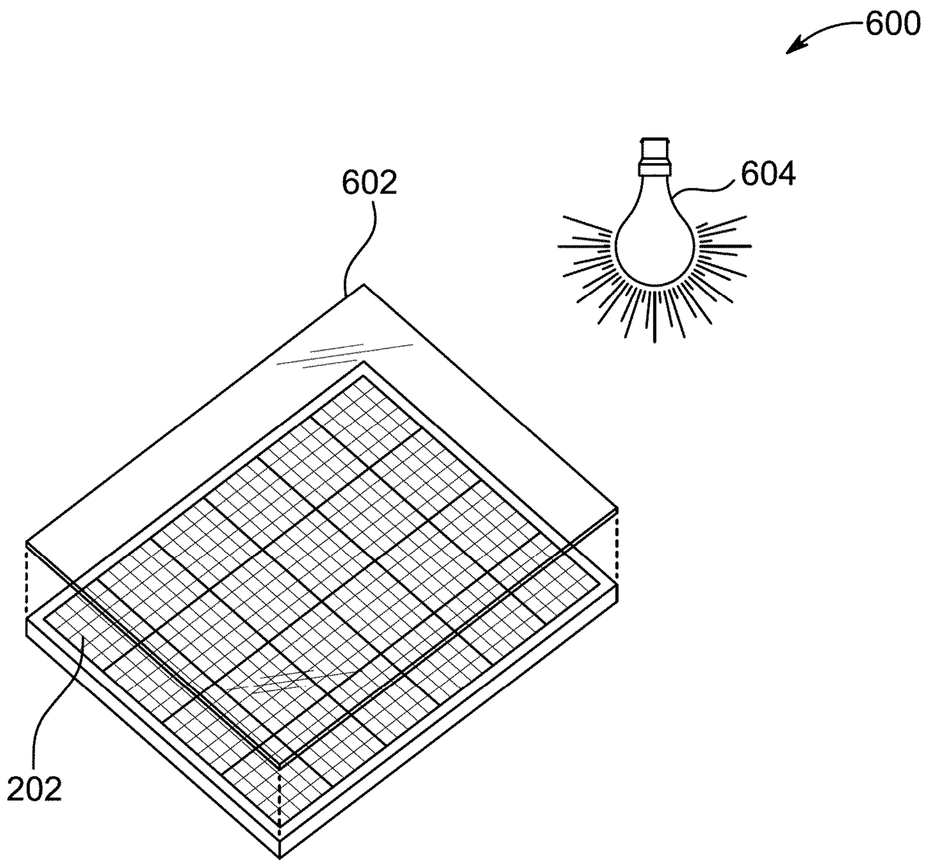
FIG. 6 is an exemplary illustration of a film on the solar panel, according to certain embodiments.

FIG. 6 illustrates an exemplary representation 600 of a film 602 positioned on the surface of the solar panels 202. The solar panels 202 are configured to absorb visible light and the film 602 is positioned on the solar panels 202, the film 602 is transparent to the visible light and configured to generate an emitted light when absorbing the source light. The film 602 includes a glass matrix and a fluorescent material dispersed therein and a light source 604 includes an ultraviolet light lamp, a light-emitting diode (LED) or the like. The light source 604 can represent some embodiments of the light sources 213. Further, the source light includes ultraviolet light and the received light includes the emitted light including visible light and the optical sensor is configured to detect the dust on the solar panels 202 based on the emitted light from the film 602, reflected sunlight from the solar panels 202 or both.

Further, the film 602 plays a dual role by being transparent to visible light while enabling dust detection through unique light-emission properties of the film 602. In some embodiments, the film 602 includes the glass matrix integrated with a fluorescent material that is evenly dispersed in the glass matrix, the glass matrix has a light transmission rate of 80% or more (e.g. 80%, 85%, 90%, 95%, 98%, 99%, 100% or any values therebetween) for visible light and the glass matrix can include silica. The transparency ensures that the film 602 does not hinder the performance of the solar panels 202.

In some embodiments, the light source 604 emits ultraviolet (UV) light, which interacts with the fluorescent material in the film 602. When exposed to the UV light, the fluorescent material absorbs the source light and generates emitted light in the visible spectrum. The emitted light serves multiple purposes: enhancing visibility for dust detection, providing a clear distinction between clean and dusty areas and improving performance of the solar panels 202. In some embodiments, the optical sensors 406 integrated into the system 100 detect the emitted light from the film 602. In some embodiments, the glass matrix of the film 602 is made from silica, chosen for durability, optical properties, and resistance to environmental factors such as UV exposure and temperature fluctuations, ensuring the longevity of the film 602 and consistent performance over time.

Figure 7:
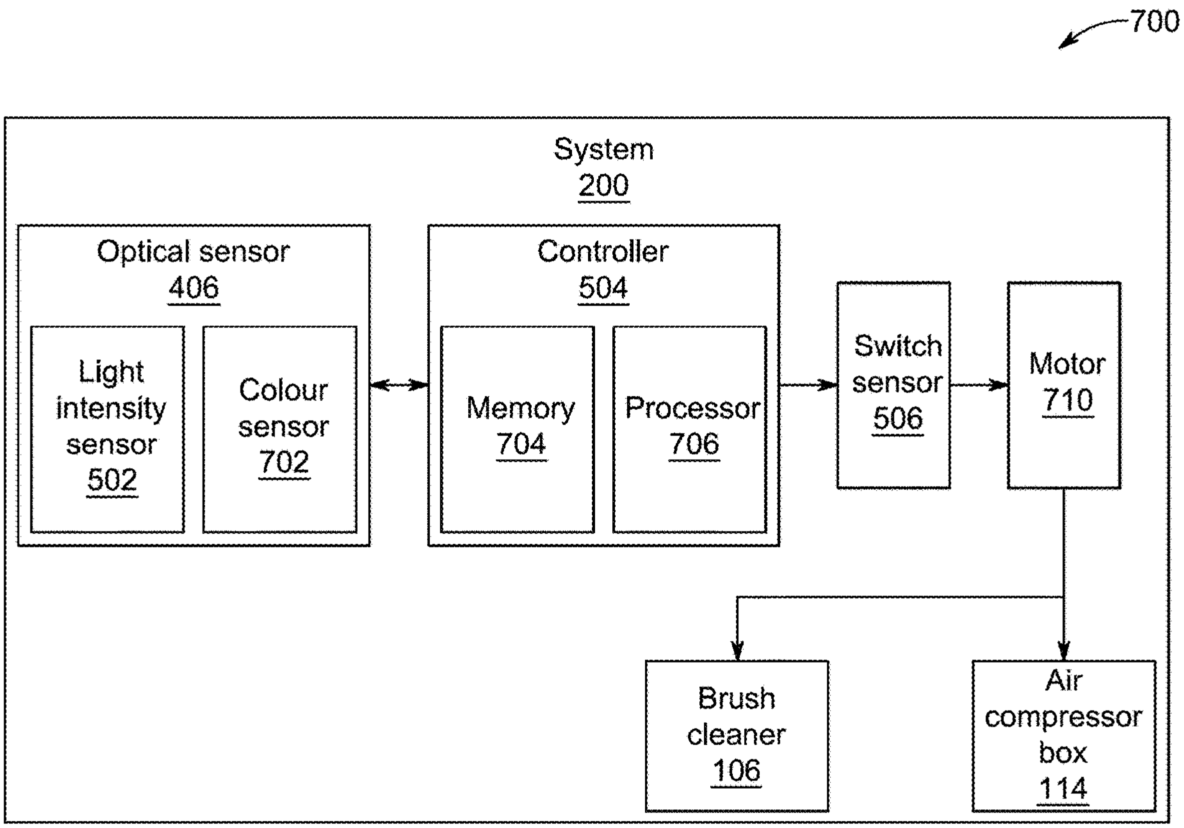
FIG. 7 is an exemplary schematic diagram of the solar panel system used within the computing system, according to certain embodiments.

FIG. 7 illustrates an exemplary block diagram 700 of the system 200. In some embodiments, the optical sensor 406 includes a color sensor 702 that is configured to determine a region of the solar panel is clean when respective reflected light rays are blue or dusty when the respective reflected light rays are brown and a light intensity sensor 502 that is configured to determine an amount of the dust on the region of the solar panel based on intensity of the respective reflected light rays. The optical sensor 406 is configured to detect dust or other contaminants on the surface of the solar panels 202. The light intensity sensor 502 measures the brightness of the light reflected from the surface of the solar panels 202, while the color sensor identifies variations in the reflected light to detect the presence of dust or impurities. The optical sensor 406 communicates with the controller 504 to transmit detection data.

In some embodiments, the controller 504 includes a memory 704, a processor 706, and program instructions that enable functionality of the controller 504. The memory 704 stores data collected from the optical sensors 406 as well as pre-configured cleaning protocols and operational parameters. The processor 706 executes program instructions to analyze the sensor data in real-time, determining the extent and location of dust accumulation. Based on the analysis, the program instructions guide the controller 504 to activate the appropriate cleaning components, such as the air nozzles 112 and the brush 108. The controller 504 is configured to determine cleaning requirements based on sensor inputs and subsequently activates the switch sensor 506 to initiate cleaning operations via the motor 710.

In some embodiments, the switch sensor 506 is operatively connected to the motor 710. The switch sensor 506 receives activation signals from the controller 504 and transfers these signals to the motor 710. The motor 710 drives the mechanical cleaning system, including the brush 108, and powers the air compressor box 114 to operate the pneumatic cleaning mechanism. For example, the motor may rotate a shaft of the brush 108 so that brush fibers attached to the shaft can clean the solar panels 202.

In some embodiments, the brush cleaner 100 is configured to perform mechanical cleaning of the solar panel surface by removing dust and debris. The movement of the brush cleaner 100 is powered by the motor 710, ensuring efficient cleaning. The air compressor box 114 complements the mechanical cleaning action by providing high-pressure air (e.g. 20-30 psi) through the air nozzles to dislodge fine dust particles.

In some embodiments, the air compressor box 114 is activated by the motor 710 upon receiving signals from the controller 504. The air compressor box 114 operates the air nozzles (not shown here) to clean areas inaccessible to the brush 108.

In some embodiments, the connectivity of the system 200 facilitates seamless operation. The optical sensor 406 transmits real-time data to the controller 504, which processes the information and triggers the switch sensor 506. The switch sensor 506 subsequently activates the motor 710, which drives both the brush 108 and the air compressor box 114. The integrated workflow ensures that the cleaning process is automated and effective.

Figure 8:
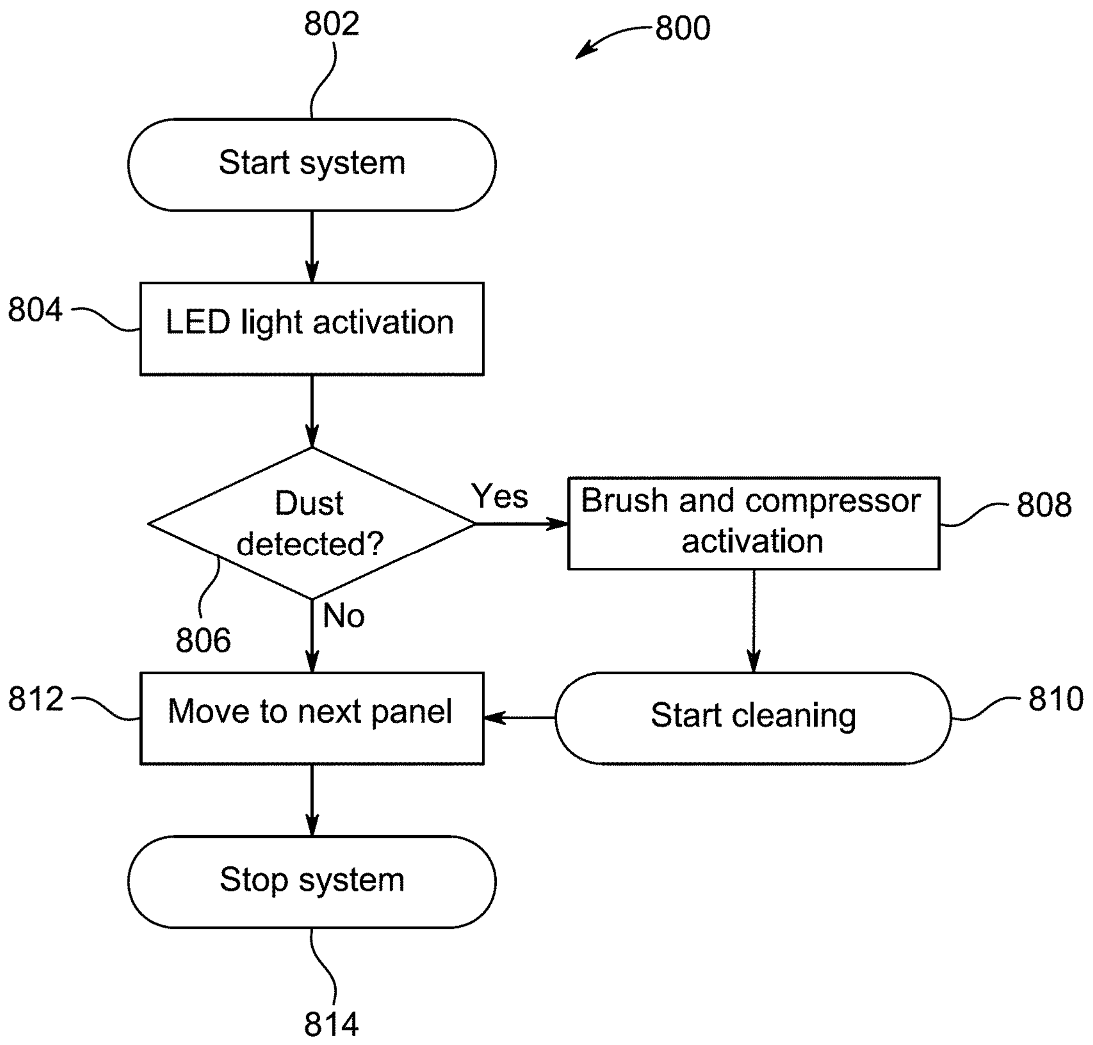
FIG. 8 is an exemplary flow diagram of operation of the solar panel system, according to certain embodiments.

FIG. 8 illustrates an exemplary flow diagram of a method 800 performed by the system 200 described in FIG. 7, according to certain aspects. The order in which the method 800 is described is not intended to be construed as a limitation, and any number of the described method steps can be combined in any order to implement the method 800. Additionally, individual steps may be removed or skipped from the method 800 without departing from the spirit and scope of the present disclosure.

At step 802, the controller 504 activates the system 200, performing diagnostic checks on all components, including the optical sensor 406 (including the light intensity sensor 502 and the color sensor 702), the switch sensor 506, the brush 108, and the air compressor box 114. The memory 704 within the controller 504 stores diagnostic data, and the processor 706 ensures that components are operational and ready for subsequent steps.

At step 804, the system activates an LED light to illuminate the solar panel surface. The optical sensor 406 relies on the illumination to accurately detect dust under various lighting conditions. The optical sensor ensures reliable operation during both daytime and low-light conditions, such as nighttime.

At step 806, the optical sensor 406, including the light intensity sensor 502 and/or the color sensor 702, evaluates the solar panel surface for dust accumulation. The optical sensor 406, including the light intensity sensor 502 and the color sensor 702 detect variations in reflected or emitted light, which are analyzed by the processor 706 in the controller 504 to determine the presence and extent of dust. The system 200 decides based on sensor detection.

At step 808, If Dust is Detected (YES): The controller 504 signals the switch sensor 506 to activate the cleaning mechanisms Step 810. The switch sensor 506 receives instructions from the controller 504 to activate the motor 710. The motor 710 powers the brush 108 to dislodge and remove dust from the solar panel surface. Simultaneously, the air compressor box 114 operates to blow away stubborn particles and clean the brush, ensuring enhanced cleaning efficiency.

At step 812, the controller 504 guides the system 200 to transition to the next solar panel in the sequence. The sensors 406, cleaning components 108 and 114, and diagnostic functions reset for the new solar panel, ensuring systematic cleaning.

At step 808, if no dust is detected (NO): The brush cleaner 100 skips cleaning and moves directly to Step 812 to process the next panel, improving energy consumption and reducing wear on the brush 108 and the air compressor box 114.

At step 814, after all designated panels are cleaned, the controller 504 powers down the brush cleaner 100, including the optical sensor 406, the motor 710, and other components. The controller 504 conserves energy and prevents unnecessary wear on components such as the brush 108 and the air compressor box 114.

Next, further details of the hardware description of the computing environment of FIGS. 1-8 are described with reference to FIG. 9. For example, a controller 900 may represent some embodiments of the controller 130.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skilled in the art would recognize. Further, CPU 901, 903 may be implemented as multiple processors cooperatively working in parallel to perform the instructions of the inventive processes described above.

Figure 9:
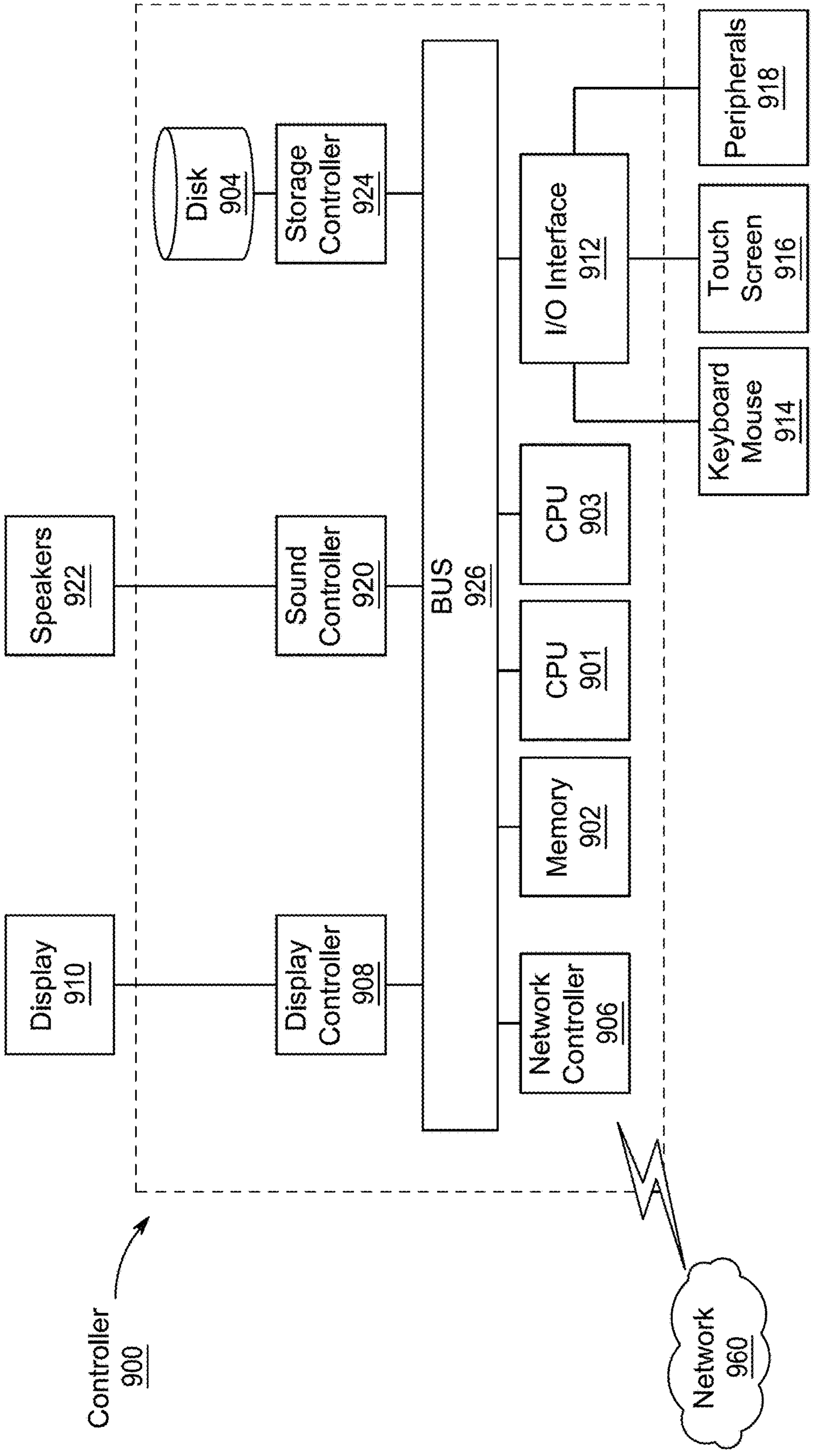
FIG. 9 is an illustration of a non-limiting example of details of computing hardware used in a computing system, according to certain embodiments.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 1214 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 10:
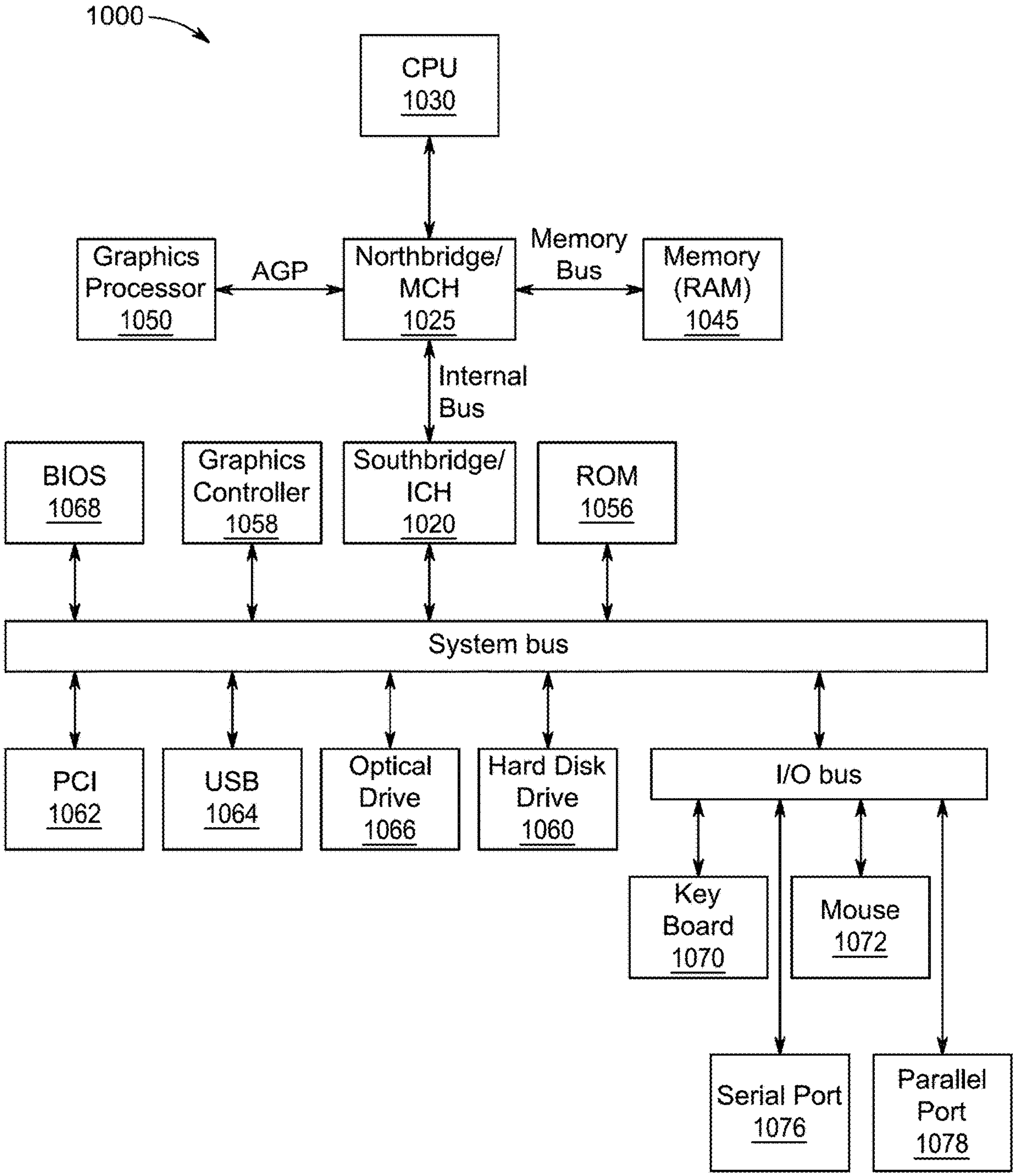
FIG. 10 is an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1185 and a south bridge and input/output (I/O) controller hub (SB/ICH) 1180. The central processing unit (CPU) 1030 is connected to NB/MCH 1185. The NB/MCH 1185 also connects to the memory 1045 via a memory bus and connects to the graphics processor 1050 via an accelerated graphics port (AGP). The NB/MCH 1185 also connects to the SB/ICH 1180 via an internal bus (e.g., a unified media interface or a direct media interface). The CPU Processing unit 1030 may contain one or more processors and even may be implemented using one or more heterogeneous processor systems.

Figure 11:
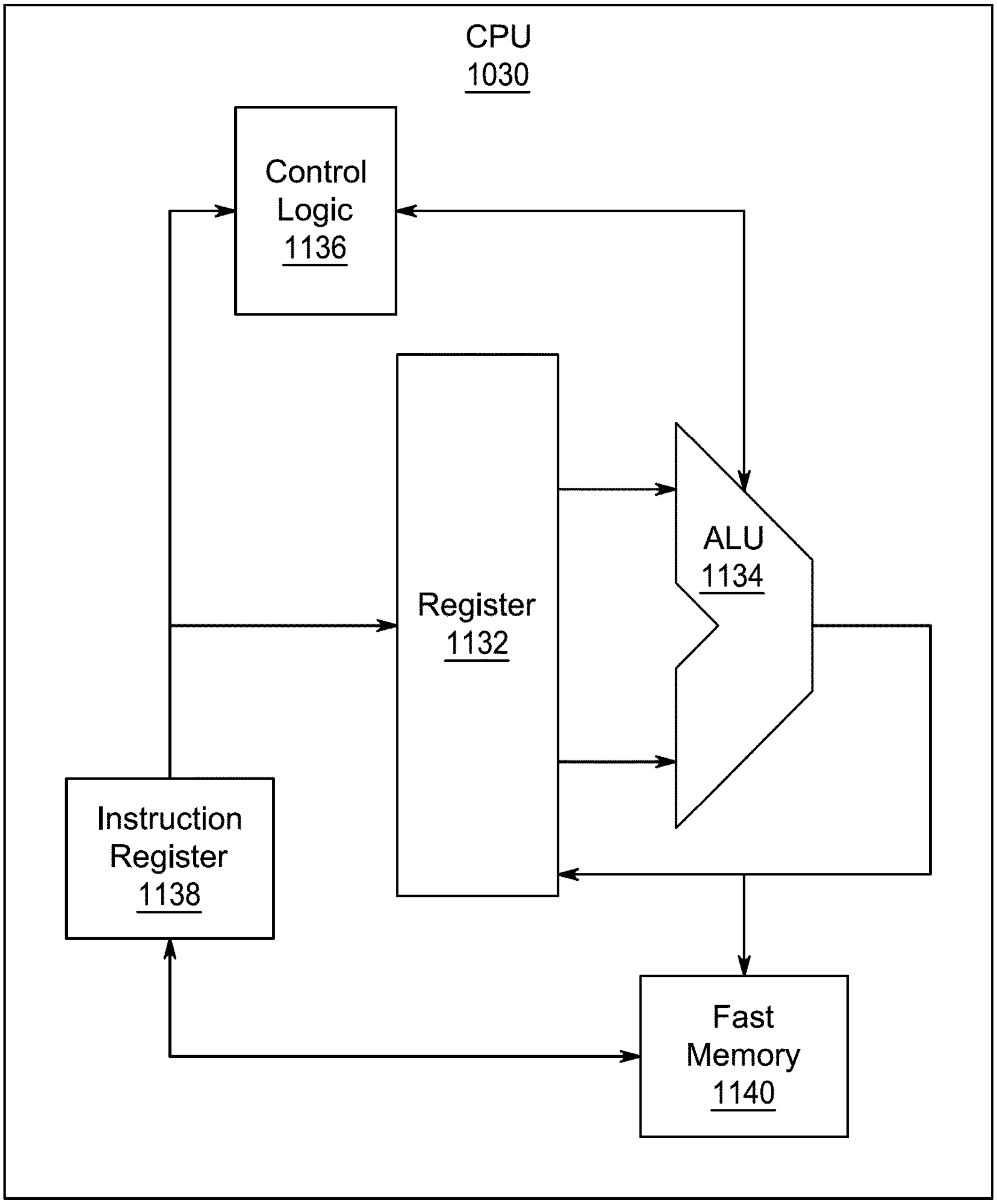
FIG. 11 is an exemplary schematic diagram of a processor used with the computing system, according to certain embodiments.

For example, FIG. 11 shows one implementation of CPU 1030. In one implementation, the instruction register 1182 retrieves instructions from the fast memory 1140. At least part of these instructions is fetched from the instruction register 1182 by the control logic 1186 and interpreted according to the instruction set architecture of the CPU 1030. Part of the instructions can also be directed to the register 1182. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1184 that loads values from the register 1182 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1180 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1180 through a PCI bus 1062.

The PCI devices may include, for example, Ethernet adapters, add-in cards, and PC cards for notebook computers. The Hard disk drive 1060 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1180 through a system bus. In one implementation, a keyboard 1070, a mouse 1072, a parallel port 1078, and a serial port 1076 can be connected to the system bus through the I/O bus. Other peripherals and devices that can be connected to the SB/ICH 1180 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
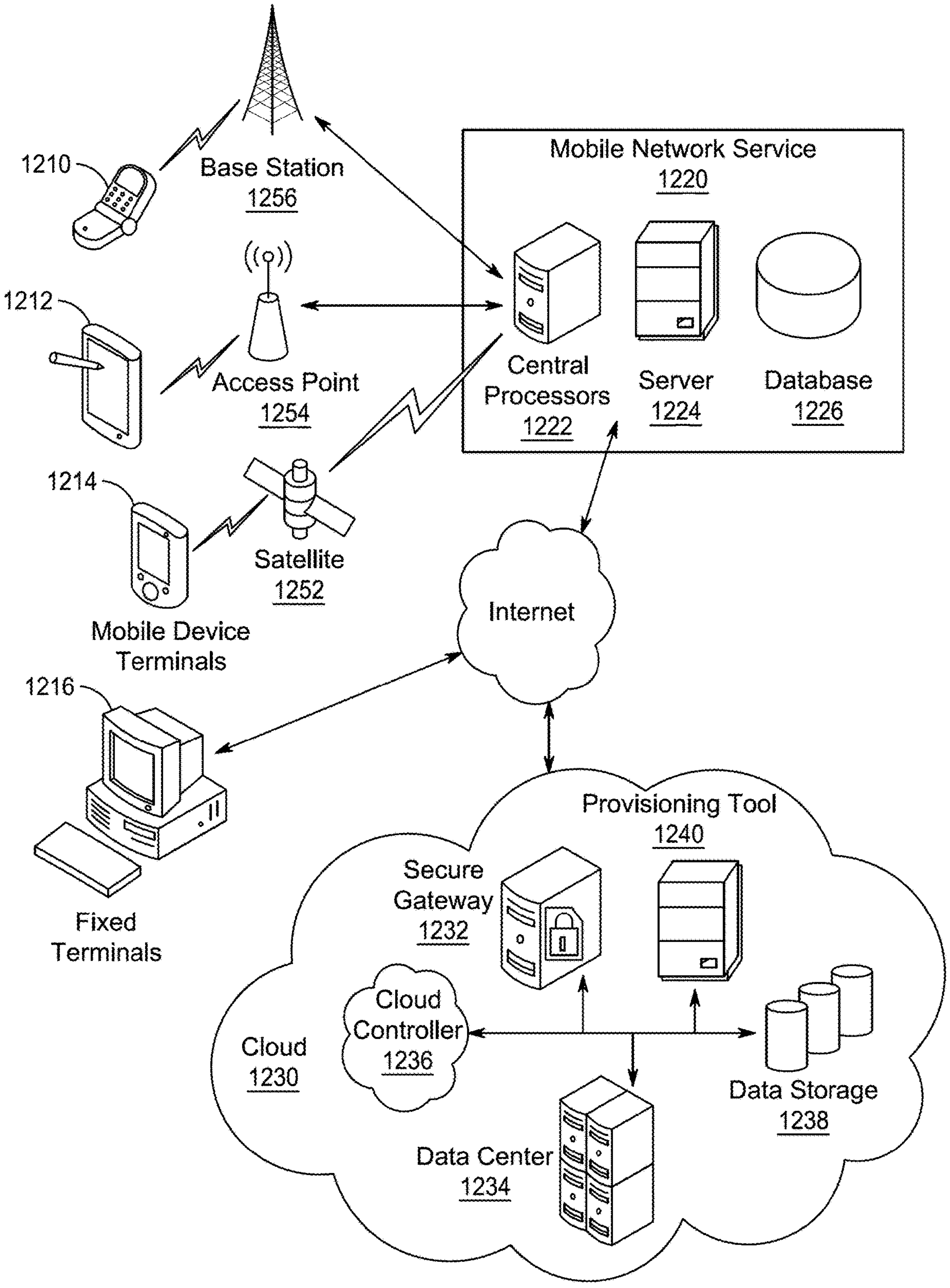
FIG. 12 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 12 illustrates client devices including smart phone 1211, tablet 1212, mobile device terminal 1214 and fixed terminals 1216. These client devices may be commutatively coupled with a mobile network service 1220 via base station 1256, access point 1254, satellite 1252 or via an internet connection. Mobile network service 1220 may include central processors 1222, server 1224 and database 1226. Fixed terminals 1216 and mobile network service 1220 may be commutatively coupled via an internet connection to functions in cloud 1230 that may include security gateway 1232, data center 1234, cloud controller 1236, data storage 1238 and provisioning tool 1240.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein. Numerous modifications and variations of the present disclosure are possible in light of the above teachings. It is therefore to be understood that within the scope of the appended claims, the invention may be practiced otherwise than as specifically described herein.

The invention claimed is:

1. A solar panel system, comprising:

solar panels configured to absorb visible light;

a frame configured to receive the solar panels therein and comprising slider structures on two sides of the frame;

a brush cleaner comprising two end structures and a brush, the two end structures coupled with the slider structures and oriented parallel to the slider structures so as to slide along the frame, the brush extending between the two end structures and configured to clean the solar panels;

a light source configured to emit a source light towards the solar panels;

an optical sensor configured to detect dust on the solar panels based on received light;

a plate attached to a first side of the brush cleaner, being in direct contact with both of the two end structures of the brush cleaner, and comprising a line of air nozzles that are configured to blow air towards the brush based on dust detection by the optical sensor; and an air compressor box positioned on one of the two end structures of the brush cleaner and positioned on one end of the plate such that the air compressor box does not block the source light, the received light or the air, wherein the brush comprises a shaft and brush fibers that are attached to the shaft and extend radially from the shaft around a circumference of the shaft, a longitudinal axis of the shaft extends parallel to the line of air nozzles, and when viewed from the longitudinal axis of the shaft, the shaft is surrounded by the brush fibers.

2. The solar panel system of claim 1, further comprising:

a film positioned on the solar panels, the film being transparent to the visible light and configured to generate an emitted light when absorbing the source light.

3. The solar panel system of claim 2, wherein:

the film comprises a glass matrix and a fluorescent material dispersed therein, and the light source comprises an ultraviolet light lamp.

4. The solar panel system of claim 3, wherein:

the source light comprises ultraviolet light, the received light comprises the emitted light comprising visible light, and the optical sensor is configured to detect the dust on the solar panels based on the emitted light from the film.

5. The solar panel system of claim 3, wherein:

the glass matrix has a light transmission rate of 80% or more for visible light.

6. The solar panel system of claim 3, wherein:

the glass matrix comprises silica.

7. The solar panel system of claim 1, wherein:

the plate extends between the two end structures of the brush cleaner.

8. The solar panel system of claim 7, wherein:

the solar panel system comprises a row of the optical sensors distributed along the plate, and each of the row of the optical sensors is positioned below a respective air nozzle of the line of air nozzles.

9. The solar panel system of claim 8, wherein:

the row of the optical sensors are configured to detect the dust as the brush cleaner slides along the frame.

10. The solar panel system of claim 7, wherein:

the brush cleaner further comprises a top panel extending between the two end structures and positioned above the brush.

11. The solar panel system of claim 10, wherein:

the top panel includes an array of holes.

12. The solar panel system of claim 1, further comprising:

a motor configured to rotate the shaft of the brush.

13. The solar panel system of claim 1, further comprising:

a controller configured to move the brush cleaner along the frame, receive dust data from the optical sensor in real time, and independently adjust air pressure of each of the line of air nozzles based on the dust data.

14. The solar panel system of claim 13, further comprising:

a switch sensor that is configured to turn off the controller at sunrise and turn on the controller at sunset by monitoring visible light intensity.

15. The solar panel system of claim 1, wherein:

the light source comprise a light-emitting diode (LED).

16. The solar panel system of claim 15, wherein the optical sensor comprises:

a color sensor that is configured to determine a region of the solar panel is clean when respective reflected light rays are blue or dusty when the respective reflected light rays are brown; and a light intensity sensor that is configured to determine an amount of the dust on the region of the solar panel based on intensity of the respective reflected light rays.

17. The solar panel system of claim 1, wherein:

the brush is as long as or longer than a width of the frame, the brush has a single rotating axis around which the shaft rotates, and the single rotating axis extends parallel to the line of air nozzles.

18. The solar panel system of claim 1, wherein:

the plate is attached to the first side of the brush cleaner, a second side of the brush cleaner is open to a surrounding environment not to block the air from the line of air nozzles, and the first side of the brush cleaner and the second side of the brush cleaner are opposing sides of the brush cleaner.

19. The solar panel system of claim 1, wherein:

the air compressor box is positioned on only one of the two end structures of the brush cleaner and positioned on only one end of the plate such that the air compressor box does not block the source light, the received light or the air.

* * * * *